United States Patent Office 3,098,042
Patented July 16, 1963

3,098,042
LUBRICANTS CONTAINING POLYBUTENE-1
Arnold J. Morway, Clark, Joseph M. Kelley, Jr., and Charles W. Seelbach, Cranford, and Delmer L. Cottle, Highland Park, N.J., assignors to Esso Research and Engineering Company, a corporation of Delaware
No Drawing. Filed Jan. 17, 1957, Ser. No. 634,610
2 Claims. (Cl. 252—39)

This invention relates to lubricating compositions containing polymers of butene-1. Particularly, it relates to greases and lubricating fluids containing polybutene-1 which has been polymerized in the presence of a catalyst mixture of a reducing agent and a reducible metal compound. Also encompassed within the invention are lubricating compositions containing polybutene-1, with or without other thickeners present, to which small amounts of an N-acyl para aminophenol or an alkylated N-acyl para aminophenol have been added to permit greater ease of dispersion of the polybutene-1 in the lubricating oil with little or no color degradation.

Prior to this invention, it has been found that olefins such as propylene, ethylene, isobutylene, etc., may be polymerized at relatively low pressures (i.e., below about 1000 p.s.i.g.), using a catalyst mixture comprising various combinations of reducing metals or reducing metallo-organic compounds with various reducible metal compounds.

However, polyisobutylene prepared by the above low pressure technique is unsatisfactory as a grease thickener as it will not form solid greases. Greases thickened with low pressure polyethylene have poor adhesion to both wet and dry metal surfaces and spatters when subjected to shock, which properties limit their use in many applications. The use of low pressure polypropylene forms greases which are ropy and cohesive, which have low adhesiveness to metal surfaces and which are difficult to dispense in normal grease lubricating equipment.

It has now been found that solid greases having good adhesion to both wet and dry surfaces may be prepared by using as a thickening agent the polybutene-1 of the invention. It has also been found that this polybutene-1 may be readily incorporated into greases containing metal soaps, metal mixed-salt or soap-salt complexes, or other polymeric thickening agents, to further improve the grease by imparting metal adhesiveness and non-spatter qualities not previously present.

The older catalytic processes for producing polybutene-1 could only produce low molecular weight polymers, e.g. polymers of about 1000 mol. wt. These low molecular weight polymers were of little value as grease thickeners. However, the polybutene-1 of the invention will have a molecular weight (according to the method described by Harris, J. Pol. Science, vol. 8, 361 (1952)) in the range of about 10,000 to 200,000, e.g. 20,000 to 160,000, and is produced in the presence of a catalyst mixture of a reducing agent and a reducible metal compound. This catalyst mixture will generally contain a molar ratio of 1 to 12, e.g. 3 to 8, moles of reducing agent per mole of the reducible metal compound. Reducing agents which may be used include: alkali and alkaline earth metals, their hydrides and alloys; aluminum compounds, such as aluminum hydrides; metallo-organo compounds such as aluminum alkyls, e.g. trialkyls, alkyl aluminum halides; etc. Reducible heavy metal compounds which may be used include halides, acetyl acetonates, etc., of heavy metals of groups III–B, IV–B, V–B and VI–B of the periodic system, as shown on pages 58–59 of Lange's Handbook of Chemistry, 7th Ed., 1949. Examples of such metals include hafnium, thorium, uranium, vanadium, chromium, molybdenum and particularly titanium and zirconium. Catalyst mixtures of the above type have recently become known in the art.

The polymerization may be carried out under pressures of 0 to 1000 p.s.i.g., e.g. 0 to 800 p.s.i.g., at temperatures of about 0° C. to 100° C., e.g. 20° to 50° C., for about ½ to 50 hours, preferably 1 to 20 hours. The reaction may be carried out in the presence of an inert liquid diluent such as a $C_5$ to $C_{10}$ aliphatic hydrocarbon, preferably saturated, e.g. alkanes such as pentane, hexane, n-heptane, decane, etc. The butene-1 feed and the liquid diluent should be free of oxygen, carbon monoxide, water, acetylene, etc. in order to avoid poisoning the catalyst. Such poisons can be removed by passing the feed or diluent through a solution of aluminum trialkyl (e.g. aluminum triethyl), or a bed of activated silica alumina, etc., prior to passing the material to the polymerization reaction zone.

The amount of catalyst used is generally 0.1 to 3.0 wt. percent based on the diluent. The amount of diluent used is such that the final concentration of polybutene-1 in the reaction product is about 10 to 30 wt. percent, based on the total weight of diluent, catalyst and polybutene-1. Upon completion of the polymerization, a material such as acetone or a $C_1$ to $C_4$ alkanol may be added to solubilize the catalyst and quench the reaction. The insoluble portion of the polymer is then removed by filtration or centrifuging and the soluble portion may be removed by stripping. The polybutene-1 product may be further purified by washing with hot alcohol.

Lubricating compositions may be prepared by dispersing at elevated temperatures, say 150° to 550° F., about 0.5 to 12.0 wt. percent, e.g. 1.0 to 6.0 wt. percent, of the polymer in either a mineral or synthetic lubricating oil. Depending upon the amount of polybutene-1 used and its molecular weight, either solid greases may be formed, or lubricating fluids may be prepared.

Synthetic lubricating oils which may be used include esters of monobasic acids (e.g. $C_8$ Oxo alcohol ester of $C_8$ Oxo acid); esters of dibasic acids (e.g. di-2-ethyl hexyl sebacate); esters of glycols (e.g. $C_{13}$ Oxo acid diester of tetraethylene glycol); complex esters (e.g. the complex ester formed by reacting one mole of sebacic acid with two moles of tetraethylene glycol and two moles of 2-ethyl-hexanoic acid); esters of phosphoric acid (e.g., the ester formed by contacting three moles of the mono methyl ether of ethylene glycol with one mole of phosphorus oxychloride, etc.); halocarbon oils (e.g. the polymer of chlorotrifluoroethylene containing twelve recurring units of chlorotrifluoroethylene); alkyl silicates (e.g.

methyl polysiloxanes, ethyl polysiloxanes, methyl-phenyl polysiloxanes, ethyl-phenyl polysiloxanes, etc.); sulfite esters (e.g. ester formed by reacting one mole of sulfur oxychloride with two moles of the methyl ether of ethylene glycol, etc.); carbonates (e.g. the carbonate formed by reacting $C_8$ Oxo alcohol with ethyl carbonate to form a half ester and reacting this half ester with tetraethylene glycol); mercaptals (e.g. the mercaptal formed by reacting 2-ethyl hexyl mercaptan with formaldehyde); formals (e.g. the formal formed by reacting $C_{13}$ Oxo alcohol with formaldehyde); polyglycol type synthetic oils (e.g. the compounds formed by condensing butyl alcohol with fourteen units of propylene oxide, etc.); or mixtures of any of the above in any proportions.

Various other additives may also be added to the lubricating composition (e.g. 0.1 to 10.0 wt. percent), for example, detergents such as calcium petroleum sulfonate; oxidation inhibitors such as phenyl alpha naphthylamine; viscosity index improvers such as polyisobutylene; corrosion inhibitors, such as sorbitan monooleate; pour depressants; dyes; other grease thickeners and the like.

The polybutene-1 may also be incorporated into greases thickened with any conventional grease thickeners such as: salts, soaps, soap-salt or mixed-salt complexes, other polymeric thickeners (e.g., polymers of $C_2$ to $C_4$ monoolefins of 10,000 to 200,000 mol. wt. such as polyethylene), or inorganic thickeners, (e.g., clay, carbon black, silica gel, etc.). The addition of the polybutene-1 to such greases imparts adhesiveness and non-spatter qualities not previously present and makes a more stable grease by tending to prevent oil separation during storage of said greases. The polybutene-1 may be directly added to said greases and dispersed by slight heating; or a lubricating oil dispersion of polybutene-1 may be added to the other greases; or the other thickeners may be added or formed in the lubricating oil dispersion of the polybutene-1. Examples of such mixed thickener greases will include greases formed by thickening a lubricating oil with about 3.0 to 35.0 wt. percent, e.g. 3 to 20 wt. percent of a salt, soap or a mixed-salt or soap-salt complex thickener, or a polymeric or inorganic thickener and containing 0.05 to 10.0, e.g. 0.1 to 5.0 wt. percent, of polybutene-1, all of said wt. percent being based on the total weight of the composition. The salt and soap thickeners are formed by the neutralization of a fatty acid with a metal base. The soap-salt and mixed-salt thickeners are formed by the neutralization of a high molecular weight fatty acid, and/or an intermediate molecular weight fatty acid, and a low molecular weight fatty acid, with metal bases, generally alkali or alkaline earth metal bases.

The high molecular weight fatty acids or aliphatic mono-carboxylic acids useful for forming the soaps, soap-salt complexes and mixed-salt complexes, include naturally-occurring or synthetic, substituted and unsubstituted, saturated and unsaturated, mixed or unmixed fatty acids having about 12 to 30, e.g. 16 to 22, carbon atoms per molecule. Examples of such acids include stearic, hydroxy stearic, such as 12-hydroxy stearic, di-hydroxy stearic, poly-hydroxy stearic and other saturated hydroxy fatty acids, arachidic, oleic, ricinoleic, hydrogenated fish oil, tallow acids, etc.

Intermediate molecular weight fatty acids include those aliphatic, saturated or unsaturated, unsubstituted, monocarboxylic acids containing 7 to 10 carbon atoms per molecule, e.g., capric, caprylic, nonanoic acids, etc.

Suitable low molecular weight acids include saturated and unsaturated, substituted and unsubstituted aliphatic monocarboxylic acids having about 1 to 6 carbon atoms. These acids include fatty acids such as formic, acetic, propionic, furoic, acrylic, and similar acids including their hydroxy derivatives such as lactic acid, etc. Formic and particularly acetic acids are preferred. Mixtures of these low molecular weight acids may be employed if desired.

The metal component of the soaps, salts or soap-salt complex thickeners of this invention may be any soap-forming metal such as aluminum, but is preferably an alkali metal such as lithium, potassium, sodium or an alkaline earth metal such as calcium, strontium, barium and magnesium. Mixtures of the grease-forming metals may be employed if desired. The metals are usually reacted with the acids in the form of metal bases, such as hydroxides, oxides, carbonates, etc.

When desired, the soaps, soap-salt or mixed-salt complex grease thickeners can be prepared in the lubricating oil containing the dispersed polybutene-1 by adding the carboxylic acids and neutralizing metal bases to the polybutene-1 containing oil and heating the resultant composition for a time and at a temperature sufficient to form the soap and/or salt. Soaps will generally be formed on heating to 320° to 360° F., while heating to 400° to 500° F. is usually necessary to form the complexes. If desired, the polybutene-1 can be added, preferably at an elevated temperature, to the composition prior to, during, or after, formation of the soap or mixed-salt complex. It will be further understood that a lubricating oil thickened to a grease consistency with a polybutene-1 of this invention may be mixed cold with a lubricating grease composition containing a soap or soap-salt thickener to thereby obtain an improved lubricating grease composition. In this case, the dispersion of the polybutene-1 in lubricating oil blends excellently with other greases.

The invention will be further understood by the following examples.

EXAMPLE I

*Preparation of the Polymerization Catalyst*

The catalyst was prepared in a nitrogen atmosphere as follows:

20 ml. of a 0.876 molar solution of triethyl aluminum in dry n-heptane was mixed with 3.4 ml. of a 0.843 molar solution of titanium tetrachloride in dry n-heptane, and 1.6 ml. of dry n-heptane was added to form a total of 25 ml. of solution. The mixture was allowed to stand for one hour before using, during which time a black precipitate formed.

*Preparation of the Polymer*

The 1.8 liter bomb used in the preparation of the polymer was a heavy stainless steel reactor, type 410 (13% Cr) sealed with a copper gasket. Agitation was obtained by rocking the reactor back and forth during the reaction by means of an electric motor. A thermocouple well in the reactor made it possible to record temperatures throughout the run and to control temperature by means of a Selectray. Connected to the reactor by means of high pressure stainless steel tubing and a high pressure stainless steel valve was a stainless steel reservoir in which the butene-1 could be collected as a liquid. The reservoir, in turn, was connected to a cylinder of nitrogen by means of stainless steel tubing and valve so that the liquid butene-1 could be forced into the reactor from the reservoir by means of nitrogen pressure.

In operation, the reactor was placed in a nitrogen-filled dry box, together with the equipment noted for preparation and for transfer of the solvent and catalyst. After all air had been displaced with nitrogen, the previously prepared 25 ml. mixture consisting of n-heptane and catalyst was transferred to the reactor and rinsed into the reactor with an additional 24 ml. of dry n-heptane, and the cap was put on. The reactor was then taken from the dry box and placed in the rocker. In the meantime, 379 grams of butene-1 was condensed in the feed reservoir which was cooled in a Dry Ice-isopropanol bath.

The connection was made between the reservoir and the reactor and the condensed butene-1 was pressured into the reactor under 400 p.s.i.g. of nitrogen. The rocker was started and the reactor was heated electrically to 81° C. and the pressure increased to 720 p.s.i.g. This temperature and pressure were maintained for 43 hours. At the end of this time, the reactor was allowed to cool to room temperature and was vented through a knock-out flask and wet test meter. The reactor was then opened and filled with 99% isopropyl alcohol to deactivate and solubilize the catalyst. The mixture was removed from the reactor and refluxed several hours in the isopropanol until the product became almost white. The mixture was then cooled and filtered. The solid white polymer removed by filtering was air dried, then dried further in a vacuum oven at 70° C. 13.3 grams of the solid polymer was obtained having an intrinsic viscosity of 1.27, which corresponds to a molecular weight of 45,000 on the Harris correlation for polyethylene. This polymer was used in preparing several of the compositions of the invention.

*Preparation of Grease Composition*

5 wt. percent of the polymer (M.W. 45,000) was added to 95 wt. percent of a naphthenic type lubricating oil having a viscosity of 55 SSU at 210° F. This mixture was heated to a temperature of about 325° F. for one hour. On cooling, a solid, stable, adhesive grease product was formed.

EXAMPLE II

A polybutene-1 having a molecular weight of 22,000 was prepared in accordance with the method of Example I, except that 290 g. of butene-1 was reacted at 80° C. and 820 p.s.i.g. for 42 hours. 46 grams of polybutene-1 was obtained which had the following properties.

Intrinsic viscosity, 0.71 (corresponds to a molecular weight of 22,000 on the Harris correlation for polyethylene).
Softening point, 95° C.
Melting point, 107° C.
Density, 0.873.
Soluble in heptane.

A grease was prepared by heating for one hour at 325° F. 5 wt. percent of the above polybutene-1 and 95 wt. percent of a naphthenic type lubricating oil having a viscosity of 55 SSU at 210° F.

EXAMPLE III

A grease similar to that of Example II was prepared, except that 1 wt. percent of the polybutene-1 (22,000 molecular weight) and 99 wt. percent of the lubricating oil was used.

EXAMPLE IV

A grease was prepared from 3 wt. percent of polybutene-1 (22,000 molecular weight), 3 wt. percent of low pressure polyethylene having a molecular weight of 200,000 and 94 wt. percent of the mineral lubricating oil, by heating and stirring the two polymers in the lubricating oil at a temperature of 400° for 2 hours.

EXAMPLE V

A grease similar to that of Example IV was prepared, except that the polyethylene had a molecular weight of 20,000 and was prepared by a high pressure process.

EXAMPLE VI

A grease was prepared by using 66.6 wt. percent of the product of Example II (5.0 wt. percent polybutene-1 in mineral oil), 20.0 wt. percent of glacial acetic acid and 13.4 % of hydrated lime. The hydrated lime was stirred into the mineral oil/polybutene-1 dispersion until a smooth, uniform slurry was formed. The mixture was then heated to 190° F. and the acetic acid was added while stirring. The mixture was allowed to cool while stirring and the grease was passed through a Morehouse mill.

EXAMPLE VII

A grease was prepared by blending at room temperature 2.5 wt. percent of the product of Example I (i.e., 5 wt. percent polybutene-1 in mineral oil) and 97.5 wt. percent of a calcium acetate complex grease.

The calcium acetate complex grease had the following formulation by weight.

| | Percent |
|---|---|
| Hydrofol Acids 51 (hydrogenated fish oil acids) | 2.0 |
| Hydrogenated castor oil | 2.0 |
| Glacial acetic acid | 8.0 |
| Hydrated lime | 6.0 |
| Phenyl α-naphthylamine | 0.5 |
| Naphthenic type mineral lubricating oil having a viscosity at 210° F. of 55 SUS | 81.5 |
| | 100 |

The calcium acetate complex grease was prepared by mixing the lime and mineral oil to form a slurry, warming the slurry to 135° F. at which temperature the Hydrofol Acids and hydrogenated castor oil were added. Acetic acid was then added and the mixture heated, while agitating, to a temperature of 500° F. The mixture was then maintained at 500° F. for 5 minutes to complete the formation of the complex. The grease was then cooled to 200° F. and the phenyl α-naphthylamine was added. The grease was then homogenized while still warm in a Gaulin homogenizer, at 6,000 p.s.i. and cooled to room temperature.

EXAMPLE VIII

A grease having the exact final composition of the grease of Example VII was prepared, except that the polybutene-1 was added to the grease kettle in the form of a dry solid along with the lime and mineral oil in forming the slurry.

The compositions and properties of the greases of Examples I to VIII are summarized in Tables I and II respectively.

TABLE I
[Percent]

| Components | Example | | | | | | | |
|---|---|---|---|---|---|---|---|---|
| | I | II | III | IV | V | VI | VII | VIII |
| Polybutene-1 (45,000 mw.) | 5.0 | | | | | | 0.13 | 0.13 |
| Polybutene-1 (22,000 mw.) | | 5.0 | 1.0 | 3.0 | 3.0 | 3.3 | | |
| Polyethylene (200,000 mw.) | | | | 3.0 | | | | |
| Polyethylene (20,000 mw.) | | | | | 3.0 | | | |
| Hydrated lime | | | | | | 13.4 | 5.85 | 5.85 |
| Glacial acetic acid | | | | | | 20.0 | 7.80 | 7.80 |
| Hydrofol Acids 51 | | | | | | | 1.95 | 1.95 |
| Hydrogenated castor oil | | | | | | | 1.95 | 1.95 |
| Phenyl α-naphthylamine | | | | | | | 0.49 | 0.49 |
| Mineral oil | 95.0 | 95.0 | 99.0 | 94.0 | 94.0 | 63.3 | 81.83 | 81.83 |

TABLE II

| Properties | Example I | Example II | Example III | Example IV |
|---|---|---|---|---|
| Appearance | Excellent smooth grease | Excellent smooth grease | Heavy viscous thixotropic gel. | Excellent smooth grease. |
| Penetration 77°F. mm./10: | | | | |
| Unworked | 300 | 340 | | 285. |
| Worked 60 strokes | 400 | 360 | | 300. |
| Worked 100,000 strokes | | | | 310. |
| Dropping Point, °F | 120–130 | 120–130 | | 250. |
| Adhesiveness to metal: | | | | |
| Dry | Excellent | Excellent | | Excellent. |
| Wet | do | do | | Displaces water. |
| Water solubility | Insoluble | Insoluble | | Insoluble. |
| AFBMA-NLGI ball bearing lubrication test: | | | | |
| 77° F | Excellent | Excellent | | Excellent. |
| 220° F | Melts | Melts | | Do. |
| Chassis lubrication | Excellent, adherent non-spatter. | Excellent, adherent non-spatter. | | (²). |
| E.P. value Timken test, 40 lbs. load | | | | |
| Spatter test | (³) | (³) | | (³). |

| Properties | Example V | Example VI | Example VII | Example VIII |
|---|---|---|---|---|
| Appearance | Excellent smooth grease | Excellent smooth grease | Excellent, stringy, adhesive grease. | Excellent, smooth, slightly stringy grease. |
| Penetration 77° F. mm./10: | | | | |
| Unworked | 295 | 300 | 275 | 280. |
| Worked 60 strokes | 305 | 315 | 285 | 285. |
| Worked 100,000 strokes | 345 | 360 | 295 | 320. |
| Dropping Point, °F | 120 | 500+ | 500+ | 500+. |
| Adhesiveness to metal: | | | | |
| Dry | Excellent | Excellent | Excellent | Excellent. |
| Wet | Displaces water | do | do | Do. |
| Water solubility | Insoluble | Soluble | Insoluble | Insoluble. |
| AFBMA-NLGI ball bearing lubrication test: | | | | |
| 77° F | Excellent | Excellent | Excellent | Excellent. |
| 220° F | Melts at 150° F | (¹) | (²) | Do. |
| Chassis lubrication | (²) | (²) | (²) | (²). |
| E.P. value Timken test, 40 lbs. load | | Pass | | |
| Spatter test | (³) | (³) | (³) | (³). |

¹ Runs out of bearing through seal.  ² Excellent, non-spatter.  ³ Does not spatter.

As seen from the above tables, polybutene-1 may be added to a lubricating oil to form non-spattering greases having excellent metal adhesiveness (Examples I and II) or, when added in smaller amounts, will form viscous lubricating fluids (Example III). The polybutene-1 blends well with other polymeric thickeners to form non-spatter greases having excellent metal adhesiveness (Examples IV and V). Example VI illustrates the use of the polybutene-1 with a salt-type thickener, while Examples VII and VIII show the use of polybutene-1 with complex type thickeners. In all cases, an excellent non-spattering grease was formed having excellent metal adhesiveness under both wet and dry conditions.

It has also been found that N-acyl p-amino phenolic derivatives, when added in small amounts along with polybutene-1, permit easier dispersion of the polybutene-1 in oil with little or no color degradation of the mineral oil dispersant. The N-acyl p-amino phenolic derivatives have no adverse affect on the lubricating compositions and, in fact, in the case of aluminum soap-thickened greases, actually improve the structural stability of the grease.

The N-acyl p-amino phenolic derivatives which may be used have the following general structure:

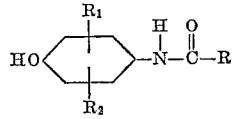

wherein R is an alkyl group containing 2 to 24, preferably 10 to 24, carbon atoms and $R_1$ and $R_2$ are hydrogen atoms or alkyl groups.

The preferred embodiment of the invention contemplates the use of compounds according to the formula above where R is a straight or branched-chain alkyl group containing from 10 to 24 carbon atoms and $R_1$ and $R_2$ are hydrogen, i.e., the N-acyl p-amino phenols. A specific example is: N-lauroyl p-amino phenol. However, the alkylate N-acyl p-amino phenols, exemplified by the formula above, wherein $R_1$ and $R_2$ are alkyl groups containing from 1 to 10, preferably 2 to 8 carbon atoms, are also very satisfactory as oxidation inhibitors. Compounds such as N-n-valeryl-4-amino-3 decyl phenol; N-n-pentanoyl-4-amino-3 octyl phenol; N-n-propanoyl-4-amino-3 pentyl phenol; N-n-pentanoyl-4-amino-2,6,di-tertiary butyl phenol; N-n-hexoyl-4-amino-2 hexyl phenol are examples of the alkylated N-acyl-p-amino phenols.

The N-acyl p-amino phenolic compounds may be used in amounts of 0.005 to 5.0 wt. percent, preferably 0.01 to 3.0 wt. percent, based on the weight of polybutene-1. The N-acyl p-amino phenolic compounds may be dissolved in the lubricating oil or lubricating oil composition prior to the addition of the polybutene-1 or may be added with the polybutene-1. The use of the N-acyl p-amino phenolic type compounds is illustrated by the following examples.

EXAMPLE IX

A polybutene-1 having a molecular weight of 160,000 was prepared at atmospheric pressure as follows:

A mixture of 0.8 gram of titanium tetrachloride dissolved in 47.5 ml. of purified n-hephane (percolated through alumina, then blown with nitrogen) was heated to 68° C. Then, to this mixture, 0.25 gram of aluminum triethyl in 2.5 ml. of purified n-heptane was added and the total catalyst mixture was maintained at 70° C. for one hour while stirring. This catalyst mixture was then added to a reactor containing 450 ml. of purified n-heptane which had been previously saturated with butene-1 at 25° C., and which also contained 0.75 gm. of aluminum triethyl. The temperature of the reactor contents was allowed to slowly rise to about 36° C., and was then maintained at this temperature during the run. The reaction was terminated after two hours by quenching the reaction mixture with isopropanol. The solid polymer which precipitated on the addition of the isopropanol was separated. 52 grams of polymer was recovered which had the following properties:

Intrinsic viscosity, 2.5 (corresponds to a molecular weight of 160,000 according to the Harris correlation for polyethylene).
Softening point, 90° C.
Melting point, 104° C.
Density, 0.881.

(A) 5.0 wt. percent of the above polybutene-1 (molecular weight of 160,000) was added to 95.0 wt. percent of a naphthenic type mineral oil having a viscosity at 210° F. of 55 S.U.S. The mixture was heated with stirring to 370° F. and held at this temperature for 2 hours until the polymer was completely dispersed.

(B) 5.0 wt. percent of polybutene-1 (molecular weight of 160,000) containing about 0.1 wt. percent of N-lauroyl p-amino phenol (based on the weight of the polybutene-1) was added to 95.0 wt. percent of mineral oil. The mixture was heated while stirring to only 330° F. for ½ hour in order to completely disperse the polymer.

EXAMPLE X (A) 5.0 wt. percent of aluminum stearate was mixed with 95.0 wt. percent of mineral oil to form a smooth slurry, followed by heating to 350° F. After reaching 350° F., the heat was turned off and the mixture was allowed to cool, without stirring, to room temperature.

(B) A slurry was formed by mixing 5.0 wt. percent aluminum stearate, 0.5 wt. percent polybutene-1 containing about 0.1 wt. percent of N-lauroyl p-amino phenol, and 94.5 wt. percent mineral oil. The slurry was heated to 350° F., then allowed to cool, without stirring, to room temperature.

EXAMPLE XI (A) A slurry was formed by mixing 8.0 wt. percent of lithium 12-hydroxy stearate with 92.0 wt. percent mineral oil, followed by heating to 400° F. The resulting grease was then cooled rapidly in thin layers.

(B) A slurry was formed by mixing 8.0 wt. percent lithium 12-hydroxy stearate, 1.0 wt. percent of polybutene-1 containing 0.1 wt. percent of N-lauroyl p-amino phenol and 91.0 wt. percent mineral oil. The grease was formed by heating to 400° F. and then cooling rapidly in thin layers.

EXAMPLE XII

A slurry was formed by mixing 8.0 wt. percent lithium 12-hydroxy stearate, 1.0 wt. percent polybutene-1, and 91.0 wt. percent mineral oil. The slurry was heated to 400° F., followed by rapid cooling. However, the cooled mixture contained lumps of undispersed agglomerated polymer. The mixture was reheated to 400° F. and maintained at this temperature for one hour in order to completely dissolve the polymer. The mixture was then cooled rapidly to room temperature in thin layers.

The composition and properties of the products of Examples IX to XII are summarized in Table III which follows.

TABLE III

| | Example | | | |
|---|---|---|---|---|
| | IX(A) | IX(B) | X(A) | X(B) |
| Component: | | | | |
| Polybutene-1 (m.w. 160,000) | 5.0% | 4.995% | | 0.4995%. |
| N-lauroyl p-amino phenol | | 0.005% | | 0.0005%. |
| Aluminum stearate | | | 5.0% | 5.0%. |
| Lithium 12-hydroxy stearate | | | | |
| Mineral oil (naphthenic type having vis. at 210° F. of 55 S.S.U.) | 95.0% | 95.0% | 95.0% | 94.5%. |
| Properties: | | | | |
| Appearance | Very dark | Clear amber | Clear smooth gel | Clear smooth gel. |
| Dropping point, °/F | 255 | 255 | 310 | 310. |
| Penetrations 77° F. mm./10: | | | | |
| Unworked | 265 | 265 | 300 | 300. |
| Worked 60 strokes | 275 | 268 | Semi-fluid | 330. |
| Worked 100,000 strokes | 290 | 275 | | 340. |
| Adhesiveness to metal surfaces | Excellent | Excellent | Poor | Good. |
| Lincoln gun dispersing test | | | Fluidized | Good. |
| Chassis lubrication | | | | Firm grease. Retained both adhesiveness and cohesiveness. |

| | Example | | |
|---|---|---|---|
| | XI(A) | XI(B) | XII |
| Component: | | | |
| Polybutene-1 (m.w. 160,000) | | 0.999% | 1.0% |
| N-lauryl p-amino phenol | | 0.001% | |
| Aluminum stearate | | | |
| Lithium 12-hydroxy stearate | 8.0% | 8.0% | 8.0%. |
| Mineral oil (naphthenic type having vis. at 10° F. of 55 S.S.U.) | 92.0% | 91.0% | 91.0%. |
| Properties: | | | |
| Appearance | Excellent, smooth | Excellent, smoooth | Dark-red soft grease. |
| Dropping point, °/F | 340 | 340 | 340. |
| Penetrations 77° F. mm./10: | | | |
| Unworked | 295 | 285 | 330. |
| Worked 60 strokes | 298 | 290 | 350. |
| Worked 100,000 strokes | 312 | 310 | Fluidizes after 10,000 strokes. |
| Adhesiveness to metal surfaces | Poor | Good | Good. |
| Lincoln gun dispersing test | | | |
| Chassis lubrication | | | |

As seen from Table III, the addition of a small amount of N-lauroyl p-amino phenol (Example IX-B) permitted easier dispersion of the polybutene with no color degradation (compare with Example IX-A). Examples X-A and X-B illustrate how the addition of polybutene-1 and N-lauroyl p-amino phenol to an aluminum stearate grease increased the metal adhesiveness of the grease while also forming a firmer grease. Examples XI-A and XI-B illustrate the improvement in adhesiveness when polybutene-1 is added to a lithium soap-thickened grease. Example XI-B further illustrates how the presence of a small amount of N-lauroyl p-amino phenol improved the structural stability of the lithium soap grease, Example XII. While the N-acyl p-amino phenolic derivatives can be used with polybutene-1 of 10,000 to 200,000 mol. wt., it is more advantageously used with the higher molecular weight polybutene-1, e.g. 50,000 to 200,000 mol. wt., which are more difficult to disperse in oil.

What is claimed is:
1. A solid lubricating grease having a dropping point in excess of about 120° F. comprising:
 (a) a major proportion of a lubricating oil;
 (b) about 3 to 35 wt. percent of calcium acetate, said calcium acetate being the sole metal salt of fatty acid present in said lubricating grease composition; and
 (c) about 0.5 to 10.0 wt. percent of a normally solid polybutene-1 having a molecular weight within the range of about 10,000 to 200,000.

2. A method of preparing dispersions of polybutene-1 of 10,000 to 200,000 mol. wt. in lubricating oil, which comprises heating said polybutene-1 in said lubricating oil in the presence of 0.01 to 5.0 wt. percent, based on the weight of polybutene-1, of an N-acyl p-amino phenolic derivative having the formula

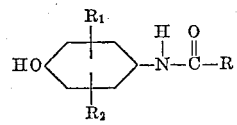

wherein R is an alkyl group containing 12 to 24 carbon atoms and $R_1$ and $R_2$ are members selected from the group consisting of hydrogen atoms and alkyl groups of 2 to 8 carbon atoms.

References Cited in the file of this patent
UNITED STATES PATENTS

| | | |
|---|---|---|
| 2,074,039 | Zimmer et al. | Mar. 16, 1937 |
| 2,094,576 | Arveson | Oct. 5, 1937 |
| 2,256,603 | Wright | Sept. 23, 1941 |
| 2,431,453 | Beerbower et al. | Nov. 25, 1947 |
| 2,525,788 | Fontana et al. | Oct. 17, 1950 |
| 2,571,354 | Fontana | Oct. 16, 1951 |
| 2,604,450 | Morway et al. | July 22, 1952 |
| 2,642,397 | Morway et al. | June 16, 1953 |
| 2,721,189 | Anderson et al. | Oct. 18, 1955 |
| 2,781,410 | Ziegler et al. | Feb. 12, 1957 |
| 2,824,090 | Edwards et al. | Feb. 18, 1958 |

FOREIGN PATENTS

| | | |
|---|---|---|
| 533,362 | Belgium | May 16, 1955 |
| 467,932 | Great Britain | June 25, 1937 |
| 710,109 | Great Britain | June 9, 1954 |
| 1,050,373 | France | Sept. 2, 1953 |